A. BORNEMAN.
CORN-PLANTER.

No. 177,195. Patented May 9, 1876.

Witnesses:
Alex Mahow
John G. Center

Inventor:
August Borneman
by A. M. Smith,
Attorney.

N. PETERS, PHOTO-LITHOGRAPHER, WASHINGTON, D.C.

UNITED STATES PATENT OFFICE.

AUGUST BORNEMAN, OF LANCASTER, OHIO.

IMPROVEMENT IN CORN-PLANTERS.

Specification forming part of Letters Patent No. 177,195, dated May 9, 1876; application filed February 18, 1876.

*To all whom it may concern:*

Be it known that I, AUGUST BORNEMAN, of Lancaster, county of Fairfield, State of Ohio, have invented certain new and useful Improvements in Corn-Planters, of which the following is a full, clear, and exact description, reference being had to the accompanying drawings, making part of this specification, in which—

Figure 1:
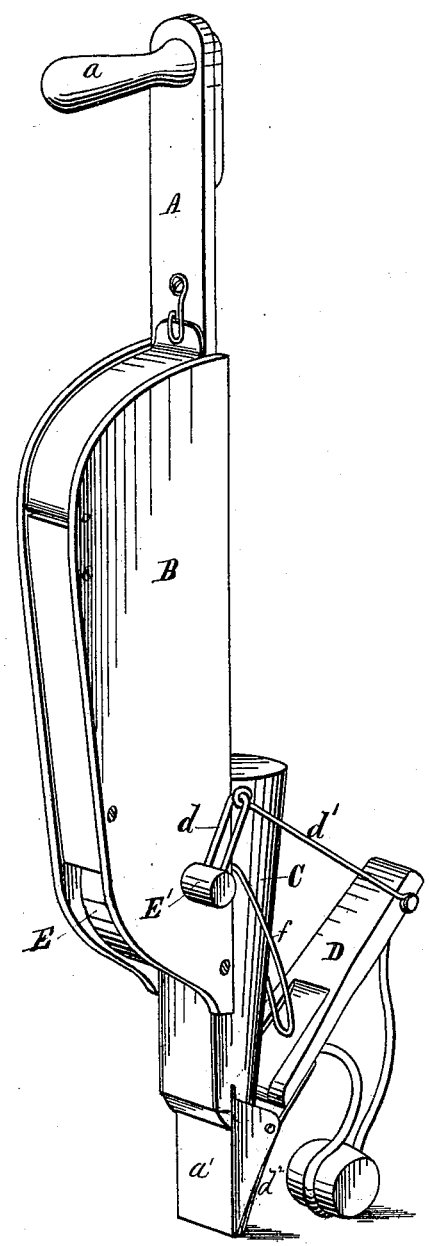
Figure 2:
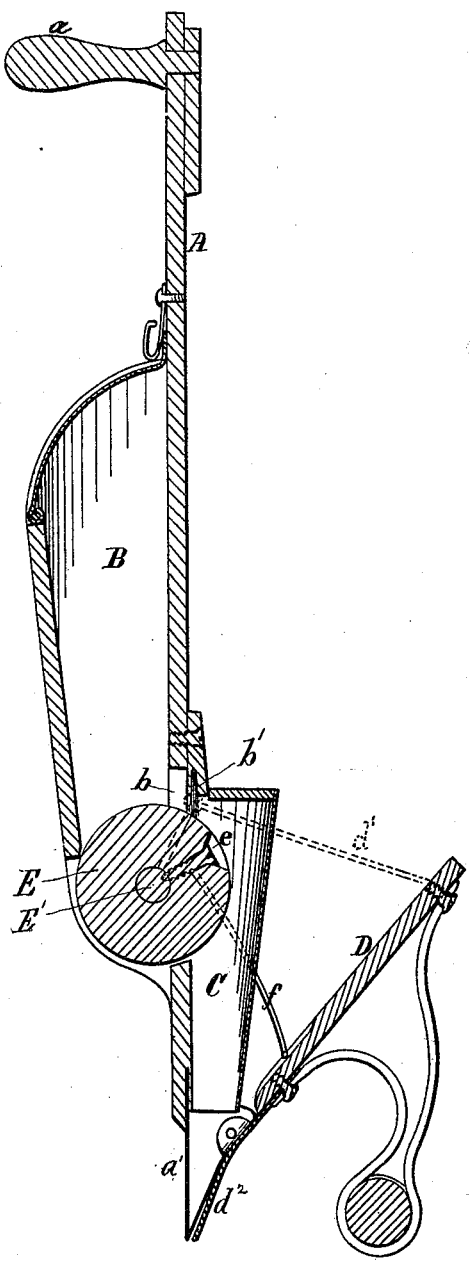

Figure 1 is a perspective view of my improved corn-planter; and Fig. 2 represents a vertical section through the same.

Similar letters of reference denote like parts in both figures.

The invention relates to that class of planters adapted to be carried in the hand of the operator walking over the field to be planted; and consists in a novel arrangement of means for effecting the discharge of the seed in regulated quantities, and in the arrangement of the spring for retracting the discharge-valves or seeding devices after they have been operated in one direction by the movement of the planter in the hand of the operator, as hereinafter described.

In the accompanying drawings, A represents the main frame-piece or staff of the planter, provided with the handle $a$, and to which the grain-box or hopper B, discharge-tube or spout C, and pivoted-valve lever D are connected—said parts being constructed and arranged in any usual or preferred manner.

The grain-box B, instead of having a fixed bottom and the usual reciprocating slide, is closed at its lower end by a roller, E, the shaft E', of which has its bearings in the side plates of the grain-box; this shaft at one end extending beyond the side plate and having a crank-arm, $d$, attached, as shown in Fig. 1.

The roller E extends through a slot, $b$, in the staff or frame-piece B working in close proximity with the lower end or wall of said slot, as shown in Fig. 2, but the slot is extended above the roller to permit the escape of the corn from the grain-box into the conductor-spout, and to prevent it from being caught and crushed between the roller and the upper wall or end of the slot, and the opening thus formed above the roller is covered by a yielding brush or broom, $b'$, which rests upon the surface of the roller, and serves to prevent the escape of the contents of the grain-box, except as carried out in regulated quantities by a pocket, $e$, in the roller E.

The crank-arm $d$ is connected by a link, $d'$, with the upper vibrating end of the valve-lever D in such manner that as said lever is vibrated by the movement of the planter and the action of a spring hereinafter described, a rocking or vibratory movement is imparted to the roller E, causing the pocket $e$ to be alternately carried into the grain-box B to be filled, and outward past the brush B' into the conductor-spout C, to be emptied of its contents.

The spring $f$ is made in angular or U shape, and has its ends bent and inserted rigidly and securely in the bar A, or the forward edges of the side plates of the hopper, from which the loop part of the spring assumes an inclined or pendent position, and rests against the inner face of the valve-lever D, the tension of the spring serving to hold the upper end of said lever away from the bar A, and to close the valve formed at the lower end of the lever between plates $a'$, $d^2$, attached to the plate or staff A and valve-lever in the usual manner.

A longitudinal groove is formed upon that portion of the valve-lever over which the loop end of the spring $f$ slides, said groove conforming in transverse section to the form of the end of the spring, and serving to steady the movements of the latter and to hold it in proper relation thereto.

By this arrangement of the spring, as nearly as practicable uniform resistance of the spring is preserved under all its varying positions. Thus, as the spring forces the lever outward, as explained, its tension diminishes as it approaches its normal position; but this diminished power of the spring is compensated for by the increasing length of the lever-arm on which it acts, and when the lever is forced toward the staff A, the resisting loop end of the spring moves toward the lever-pivot, and, consequently, while the tension of the spring is increased the length of the lever-arm is correspondingly diminished, thus serving to equalize the power of the spring.

The operation of the planter, aside from that of the parts particularly described above, is too well understood to require further description.

I am aware that oscillating seed-rollers have been employed in hand-planters, operated by means of a vibrating foot; also, that springs have been employed for retracting the valve-lever, and I therefore do not claim these parts broadly and irrespective of their arrangement; but What I do claim as new, and desire to secure by Letters Patent, is—

1. The combination, in a hand-planter, of the roller E, crank-arm $d$, link $d'$, and valve-lever D, all arranged and operating, as described.

2. The compensating-loop or U-shaped spring $f$, applied to the staff or frame A, and operating in combination with the valve-lever D, substantially as and for the purpose described.

AUGUST BORNEMAN.

Witnesses:
J. B. TOWNSLEY,
R. M. DRISBACH.